June 2, 1925.
J. LUNDGREN
1,540,643
BALANCE TESTING MACHINE
Filed Dec. 7, 1922   3 Sheets-Sheet 1
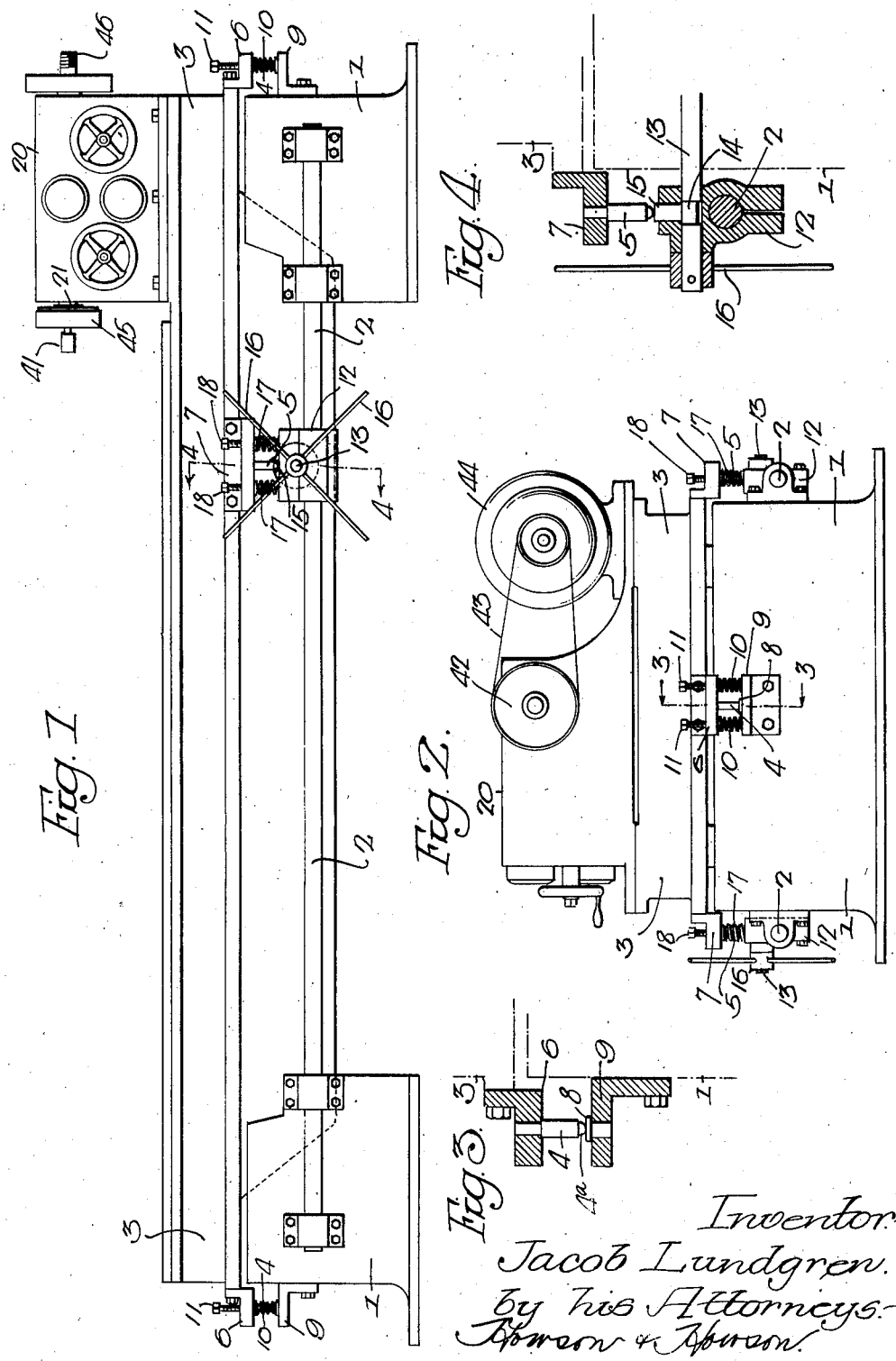

June 2, 1925.　　　　　　　　　　　　　　　　　1,540,643
J. LUNDGREN
BALANCE TESTING MACHINE
Filed Dec. 7, 1922　　　3 Sheets-Sheet 2
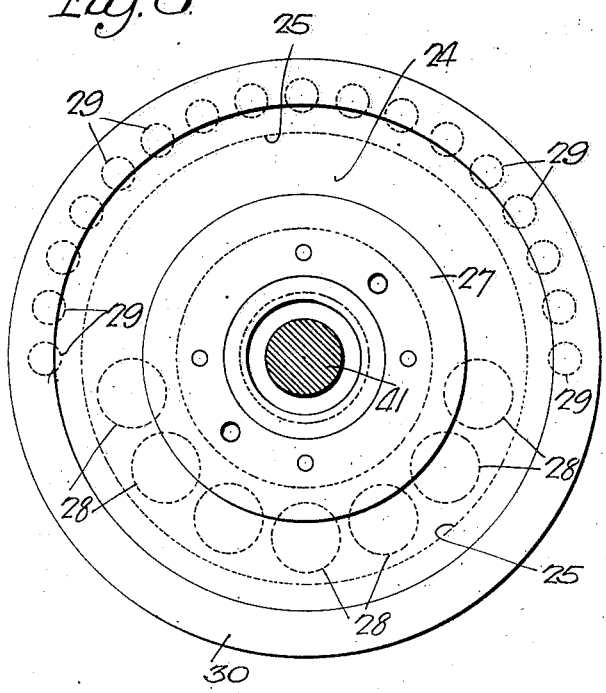
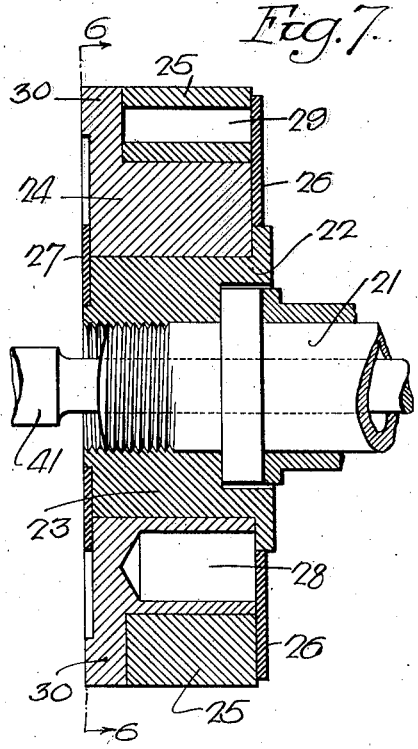
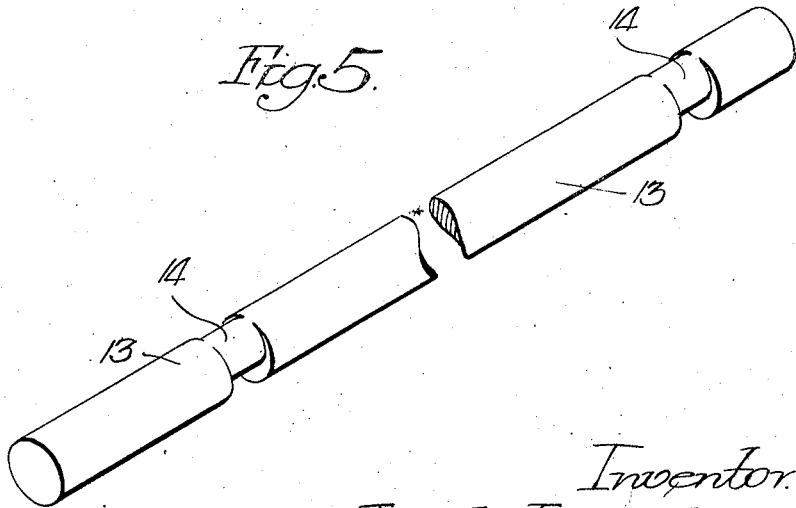
Inventor—
Jacob Lundgren.
by his Attorneys June 2, 1925. 1,540,643
J. LUNDGREN
BALANCE TESTING MACHINE
Filed Dec. 7, 1922 3 Sheets-Sheet 3
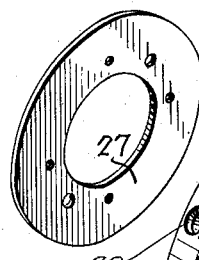
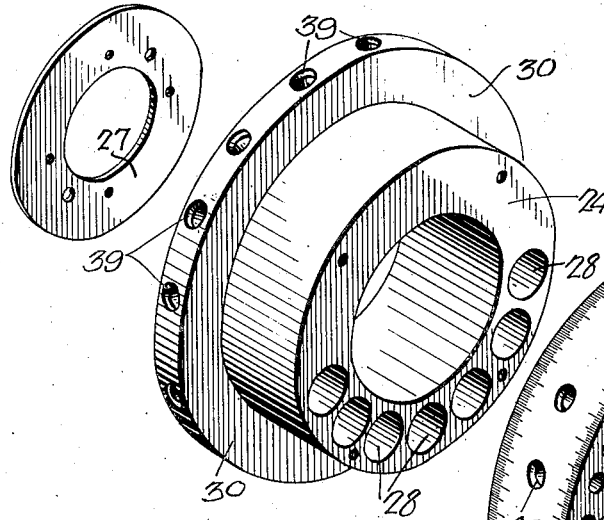
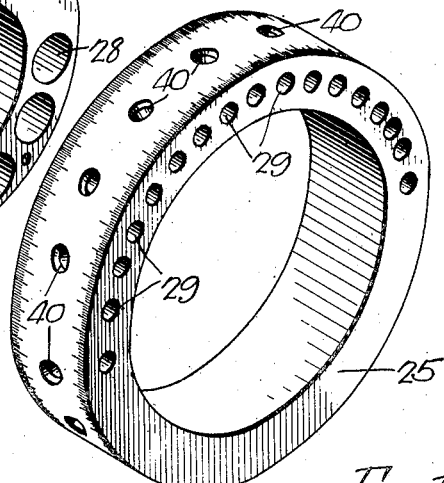
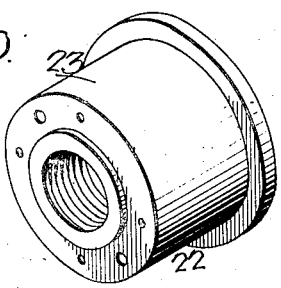
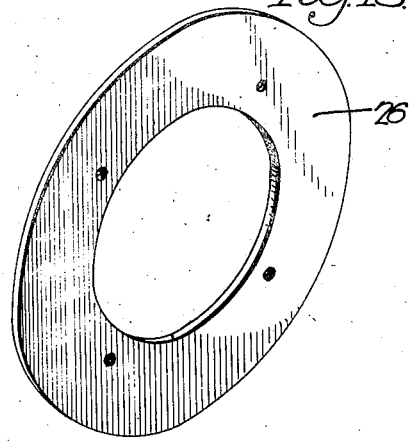
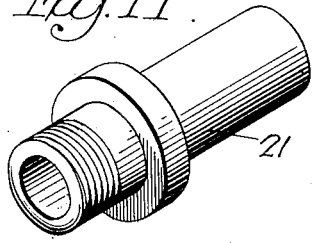
Inventor—
Jacob Lundgren.
by his Attorneys Patented June 2, 1925.

1,540,643

UNITED STATES PATENT OFFICE.

JACOB LUNDGREN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

BALANCE-TESTING MACHINE.

Application filed December 7, 1922. Serial No. 605,425.

*To all whom it may concern:*

Be it known that I, JACOB LUNDGREN, a citizen of the United States, residing in Philadelphia, Pennsylvania, have invented a Balance-Testing Machine, of which the following is a specification.

My invention relates to improvements in balancing machines, and more particularly in that type of machine illustrated and described in my co-pending applications, Serial Numbers 219,066; 238,138; 464,600; and United States Patent No. 1,398,333, dated November 29, 1921, and employed for the purpose of determining and locating both static and dynamic unbalance in test bodies.

One object of my invention is to provide means whereby it is possible to test both for static and dynamic unbalance in a test body without changing the relative adjusted positions of the test body and the counterbalance elements employed in the machine to counteract the effect of unbalance in the test body.

Another object of the invention is to provide commercially practicable means whereby in the absence of dynamic unbalance, it is possible, without stopping the machine and without using a compensator and without changing the relative angle between the compensating weights and the test body, to locate the point along the axis of rotation of the body at which to make the correction for static unbalance.

A further object of the invention is to provide means whereby the bed of the machine may be shifted from the static to the dynamic supports while the machine is in operation.

The mechanism whereby these and still further objects hereinafter set forth are accomplished is illustrated in the attached drawings, in which:

Figure 1, is a side elevation of a machine made in accordance with my invention;

Fig. 2 is an end elevation of the machine;

Fig. 3, is a fragmentary section on the line 3—3, Fig. 2;

Fig. 4, is a fragmentary section on the line 4—4, Fig. 1;

Fig. 5, is a view in perspective of the bed-elevating shaft;

Fig. 6, is a section on the line 6—6, Fig. 7;

Fig. 7, is a fragmentary section through the static compensator illustrating the details of the compensator and the method of its attachment to the spindle of the headstock.

Fig. 8, is a view in perspective of the inner static ring of the static compensator;

Fig. 9, is a view in perspective of the outer static ring;

Fig. 10, is a view in perspective of the spindle collar of the static instrument;

Fig. 11, is a view in perspective of the outer end of the spindle to which the static instrument attaches, and Figs. 12 and 13, are, respectively, elements in perspective of the front and back retaining plates.

With reference to the drawings, the machine comprises a base structure consisting in the present instance of a pair of pedestals 1, 1, joined together by tie rods 2, 2, the pedestals constituting a support for a movable bed 3 of well known type. The bed 3 in the present instance has four points of contact with the base structure, one at each end of the bed and on the longitudinal center line thereof, and one at each side in a vertical plane suitably located longitudinally of the bed, as will be hereinafter described.

The end contacts and the side contacts are adapted respectively to function in pairs to support the bed, and means is provided after the usual manner whereby the bed may be shifted from one pair of supports to the other at the will of the operator. In the present instance, the supports are in the form of pins 4, 4, and 5, 5, which extend downwardly from suitable brackets 6 and 7 respectively, bolted in the present instance to the ends and the sides of the bed respectively. The pins 4, 4, at the ends of the bed have in sockets in their lower ends balls 4ª, and each is adapted to rest upon a bearing element 8 carried by a bracket 9 bolted in the present instance to the ends of the pedestals 11. On each side of the pins 4 confined between the adjacent faces of the brackets 6 and 9, is a pair of springs 10, 10, there being provided bolts or studs 11 by means of which the tension of the springs may be adjusted.

Carried by each of the rods 2, 2, and occupying positions beneath the brackets 7, to which the pins 5 are secured, is a member 12, each including a bearing for a lateral shaft 13 which extends laterally of the machine underneath the bed 3, and which comprises eccentric portions 14 upon which rest supporting elements 15 vertically slidable in the members 12. As clearly shown in Fig. 4, these elements or pins 15 constitute bearing elements for the pins 5, and means is provided such as a turning lever 16 on the projecting end of the shaft 13 for rotating the shaft whereby, by reason of the eccentricity of the portion 14, the bearing element 15 is adjusted vertically, the arrangement being such that when the said member is elevated, the bed is elevated from the supports 4, 4, which are active when the elements 15 are in their low positions. Similar to the supports at the ends of the bed, the side supports also include springs 17 positioned one at each side of each of the pins 5, these springs being confined between the members 12 and the bracket 7, and their tension being adjustable by means of adjusting bolts 18, 18, in the bracket 7.

It will be noted that regardless of which set of support elements 4 or 5 is active, these pins constitute a positive support for the bed at all times, the springs 10 and 17 merely tending to maintain the bed in a normal horizontal balanced position.

The bed 3 is provided with the usual head-stock 20 which houses the counterbalancing mechanism, including the usual weights rotatable about an axis which in the present instance is perpendicular to the axis of the body tested, the weights in rotation counterbalancing the effect upon the bed of unbalance in the rotating body. This portion of the machine is essentially similar to the machines set forth and described in my co-pending applications, Serial Numbers 219,066; 238,138; and the aforesaid United States Patent No. 1,398,333. The operation of this mechanism is clearly set forth in the aforesaid applications, and is well understood by those acquainted with the art.

In addition, however, to the aforesaid mechanism, I preferably employ in the present instance a static compensator of the type disclosed in my co-pending application, Serial Number 464,600. Instead of mounting this compensator after the manner shown in the aforesaid application, I, in the present instance, mount the static compensator on the spindle 21 of the machine, as shown in Figs. 1 and 7, or on a shaft that coincides with the axis of rotation of the body to be tested.

This static compensator is in all essential respects identical with the compensator disclosed in my aforesaid pending application, and consists of a collar 22 internally threaded in the present instance to provide a means for securing it to the spindle 21, the spindle also being threaded to correspond with the internal threads of the collar. As clearly illustrated, the spindle collar 22 is concentric with the spindle, and comprises a cylindrical portion 23 upon which is rotatably mounted on inner cylindrical ring 24, upon which in turn is mounted an outer ring 25. A back retaining plate 26 is provided, which is suitably secured to the inner ring 24 and extends over the end of the ring 25, as shown in Fig. 7, whereby the latter ring is retained in place upon the inner ring 24, while a front retaining plate 27 is also provided which is secured in suitable manner to the spindle collar 22 and which partially extends across the front face of the inner ring 24 whereby the latter is retained on the collar 22.

As shown in Figs. 7 and 8, the inner ring 24 is provided with a series of apertures 28, 28, which are disposed in an evenly spaced row embracing 180° of the ring, while a similar but smaller and more numerous series of apertures 29 is provided in the outer ring 25, also embracing 180° of this latter ring. The ring 24 is provided in the present instance with a flange 30 which constitutes the front abutment for the ring 25, as shown in Fig. 7, and this flange has extending around the periphery thereof a series of radial recesses 39, a similar series of recesses 40 being provided in the periphery of the outer ring 25, and these recesses 39 and 40 being adapted for the reception of a lever, by means of which the respective rings may be rotated, both on the collar 22 and with respect to each other. The outer ring 25 is provided on its periphery and along each edge with graduations whereby the parts may with facility be adjusted to give any degree of unbalance that may be required.

The operation of this type of instrument is well described in my aforementioned application, Serial Number 464,600, and for the present purpose, it will be sufficient to state that by adjustment of the rings 24 and 25 upon the collar 22 and with respect to each other, an unbalance may be obtained which exactly counteracts the effect on the bed of static unbalance existing in a test body.

It will be understood that the spindle 21 to which this static compensator is in the present instance attached is flexibly connected with the body tested through the driving rod 41, which is coupled to the body under test and through which the body is rotated, the spindle 21 and the operating rod 41 being operatively connected by means of a pulley 42 on the rear end of the spindle and on a belt 43 with an electric motor 44 suitably mounted on the bed.

It will accordingly be apparent that where desired, the compensator which in Fig. 1 I have designated by the reference numeral 45, may be equally well mounted on the rear projecting end 46 of the spindle which, as shown in Fig. 1, may be threaded to receive the spindle collar.

The operation of the machine is as follows:

A body to be tested is mounted in the usual manner for rotation upon the bed 3 with its axis coinciding with the axis of the spindle, and the body is coupled in the usual manner with the drive shaft 41. The shaft 13 is so adjusted that the supporting element 15 is in its low inoperative position whereby the bed is supported upon the pins 4, 4, known as the static supports. These pins which afford a longitudinal axis of oscillation for the bed are in a vertical plane in which also lie the axis of the spindle and, by reason of its mounting, the axis of rotation of the test body, and it will thus be noted that the axis of rotation of the counterbalancing weights is parallel to a plane passing through both the static supports and the axis of rotation of the test body, and that a line through the dynamic supports lies at right angles to this plane.

With the static compensator set at zero and inoperative, the body is now tested in the usual manner for static unbalance and the static reading noted. Without stopping the machine, the shaft 13 is now rotated to elevate the elements 15 whereby the bed is removed from the pins 4 and the support shifted to the pins 5 at the sides and the body tested in the usual manner while on the dynamic supports. This ability to test successively on the static and dynamic supports without stopping the machine resides, as will be apparent to those acquainted with the art, in the fact that owing to the relative positions of the static and dynamic supports, the test body, and the counterbalancing or compensating elements, it is unnecessary in shifting from the static to the dynamic supports to alter the angle between the compensating weights and the test body, since the plane of the tested unbalance, either static or dynamic, will always have the same direction from or relative to an arbitrary selected plane in the vibrating bed for both static and dynamic setting of machine.

If now in the dynamic test it is possible to eliminate entirely vibration in the bed, this constitutes an indication that no dynamic couple exists in the body, and it is then possible to compute the point longitudinally of the axis of the test body at which the correction in the plane of static unbalance should be made. As previously stated, the static reading was noted, and it will be apparent with the arrangement illustrated in Fig. 1, that with the bed on the dynamic supports and the bed in balance, the reading on the indicator multiplied by the distance of the axis of rotation of the body tested from the line passing through the static support should equal the original static reading multiplied by the distance from the vertical plane through the pins 5 along the axis of rotation of the test body to the position of the static unbalance in the body.

Knowing the original static reading, the reading on the indicator, taken with the bed in balance on the dynamic supports, and the distance of the axis of rotation of the tested body from the line passing through the static supports, it is accordingly possible to write an equation by means of which the fourth or unknown quantity, namely,— the distance from the vertical plane passing through the dynamic supports along the axis of rotation of the body tested to the position longitudinally of the axis of the body at which the correction for the static unbalance should be made may be determined. As an illustration of such equation, we may cite the following:

$$\text{since } S \cdot X = D \cdot Y$$
$$X = \frac{DY}{S}$$

where X is the aforesaid required distance; S the static reading; D the reading on the indicator with the bed balanced on the dynamic supports, and Y the distance of the axis of rotation of the tested body from the line passing through the static supports.

If after the bed has been shifted from the static to the dynamic supports, it is not possible to eliminate vibration in the bed without changing the relative angle between the body tested and the compensating weights, dynamic unbalance exists in the body, and although it is still possible by use of the above formula to determine the point longitudinally of the axis of rotation of the body which is the best point at which to make the correction for the static unbalance, it is not possible to determine the exact amount of the dynamic unbalance without either actually correcting the static unbalance in the body or having recourse to the static compensator. This latter instrument accordingly constitutes a commercially practicable means for determining the actual amount of dynamic unbalance existing in a test body without the necessity for interrupting the operation of the machine and actually making the static correction in the body. This compensator is adjusted to exactly counteract the static unbalance in the body and thereby to negate the effect of this static unbalance on the bed, and the dynamic reading then taken in the usual manner indicates the exact amount of the dynamic unbalance in the body.

It will be noted, therefore, that by mounting the bed in the aforedescribed manner, I am able without interupting the operation of the machine, to determine the amount and location longitudinally of the axis of the test body of existing static unbalance, and I am further able, if dynamic unbalance exists, by means of the static compensator to also obtain in a continuous uninterrupted operation of the machine in addition to the static unbalance and its position longitudinally of the body, the amount of the dynamic unbalance. In addition to these manifest advantages, with springs of given capacity and with the bed mounting described, the machine is adapted for a much greater range of load than was possible in machines of the old type. It will further be apparent that by reason of the position of the dynamic supports, the sensitiveness of the machine for detecting dynamic unbalance is increased, this being particularly valuable in long machines. It will be noted further that whereas in machines of the old type, in which the bed is supported at one side entirely upon springs, any unequal adjustment of the springs tends with the machine in vibration to distort the bed, there is in the present machine no tendency for such distortion, since practically the entire weight of the bed falls upon the pivot pins and the forces are accordingly evenly distributed.

I claim:

1. In a balance testing machine, the combination with an oscillatory support structure, of means for rotatively mounting a test body upon the structure, means for suspending the structure to afford an axis of oscillation parallel to the axis of rotation of said body and in a perpendicular plane passing through the axis of the test body, and means for suspending the structure to afford an alternative axis of oscillation at right angles to said plane.

2. In a balance testing machine, the combination with an oscillatory support structure, of means for rotatively mounting a test body upon the structure, means for suspending the structure to afford an axis of oscillation parallel to the axis of rotation of said body and in a plane passing through the axis of the test body, and means for suspending the structure to afford an alternative axis of oscillation at right angles to said plane.

3. In a balance testing machine, the combination with an oscillatory support structure, of means for rotatively mounting a test body upon the structure, means for suspending the structure to afford an axis of oscillation in a plane passing through the axis of oscillation of the test body, and counterbalancing means mounted on the structure and having an axis of rotation parallel to said plane.

4. In a balance testing machine, the combination with a support structure having alternative axes of oscillation, of means for rotatively mounting a test body upon the structure with the axis of rotation of the body paralleling one of said axes of oscillation, the other of said axes of oscillation lying at right angles to a plane passing through the axis of rotation of the body and the axis of oscillation which it parallels, and counterbalancing means mounted on the support structure and rotatable about an axis parallel to said plane.

5. In a balance testing machine, the combination with an oscillatory support structure, of means for rotatively mounting a test body upon the structure, means for suspending the structure to afford an axis of oscillation in a plane passing through the axis of rotation of the test body, counterbalancing means mounted in the structure and having an axis of rotation parallel to said plane, and means for suspending the structure to afford an alternative axis of oscillation lying at right angles to said plane.

6. In a balance testing machine, the combination with an oscillatory structure, of means for rotatively mounting a test body upon the structure, counterbalancing means rotatively mounted on the structure, means for suspending the structure to afford an axis of oscillation in a plane passing through the axes of rotation of the test body and the said counterbalancing means, independent counterbalancing means mounted in the structure and having an axis of rotation parallel to said plane, and means for suspending the structure to afford an alternative axis of oscillation at right angles to said plane.

7. In a balance testing machine, the combination with an oscillatory support structure, of means for rotatively mounting a test body upon the structure, counterbalancing means rotatively mounted on the structure, means for suspending the structure to afford an axis of oscillation parallel to the axis of rotation of the test body in a plane passing through the axes of rotation of the test body and the said counterbalancing means, independent counterbalancing means mounted in the structure and having an axis of rotation parallel to said plane, and means for suspending the structure to afford an alternative axis of oscillation at right angles to said plane.

8. In a balance testing machine, the combination with an oscillatory support structure, of means for rotatively mounting a test body upon the structure, rotative means having an axis in alignment with the axis of rotation of the body for creating an unbalance in the structure to counteract the effect upon the support of static unbalance existing in the rotating body, means for suspending the structure to afford an axis of oscillation in a plane passing through the axis of rotation of the test body, independent counterbalancing means mounted in the structure and having an axis of rotation parallel to said plane, and means for suspending the structure to give an alternative axis of oscillation at right angles to said plane.

9. In a balance testing machine, the combination with a bed, of a plurality of supports affording alternative axes of oscillation for the bed, resilient means tending to maintain the bed in a substantially horizontal position, and means for adjusting one support vertically to thereby determine the axis of oscillation.

10. In a balance testing machine, the combination with an oscillatory support structure, of means for rotatively mounting a test body upon the structure, a counterbalancing member rotatively mounted in the structure, means for rotating the member to counteract the effect upon the structure of unbalance in the rotating test body, means for suspending the structure to give alternative axes of oscillation, and adjustable means permitting the shifting of the bed from one axis of oscillation to another while the said test body and counterbalancing member are in rotation.

JACOB LUNDGREN.